(No Model.)
R. F. NENNINGER.
PROCESS OF TREATING MATERIALS CONTAINING METALS.
No. 488,898. Patented Dec. 27, 1892.
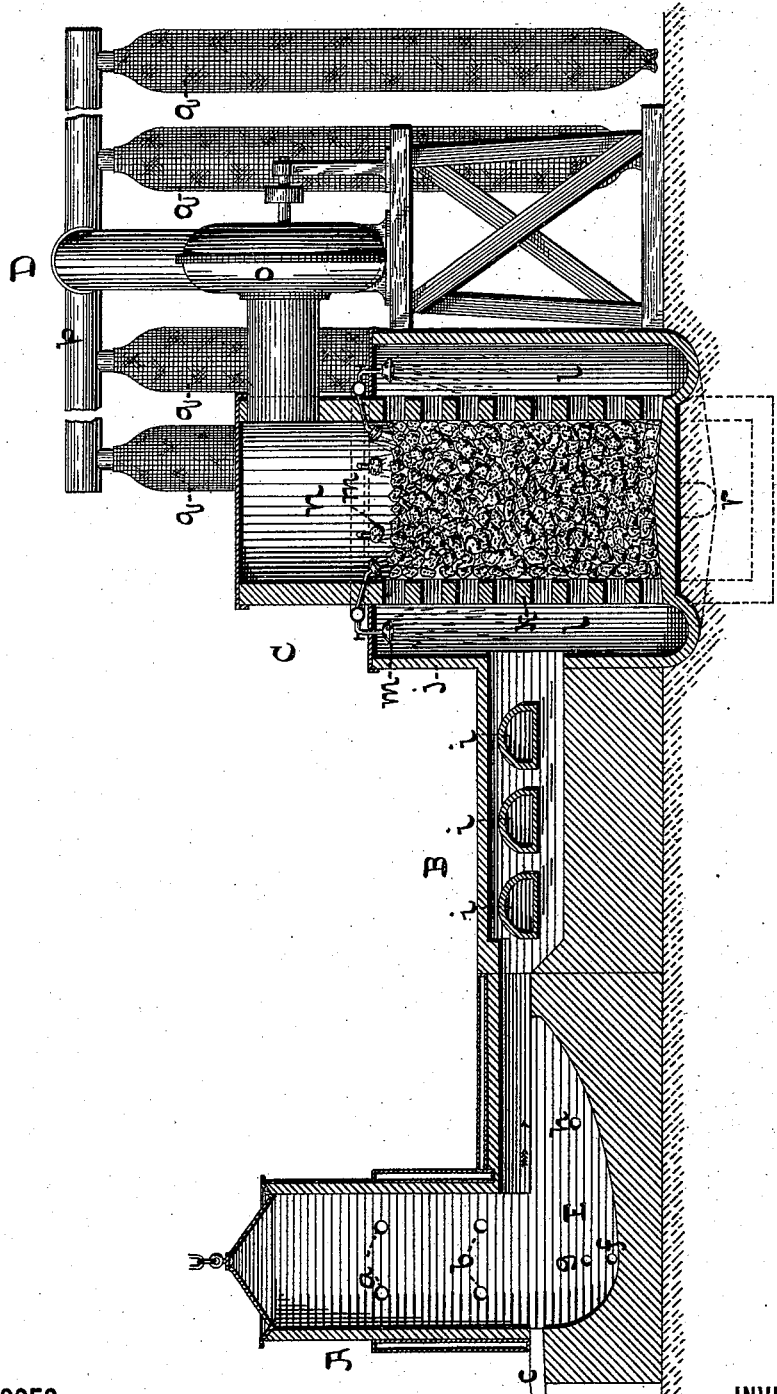
WITNESSES:
F. Fohr.
A. Faber du Faur
INVENTOR:
Robert F. Nenninger,
BY A. Faber du Faur Jr.
his ATTORNEY

UNITED STATES PATENT OFFICE.

ROBERT F. NENNINGER, OF NEWARK, NEW JERSEY, ASSIGNOR TO EDWARD J. ILL, OF SAME PLACE.

PROCESS OF TREATING MATERIALS CONTAINING METALS.

SPECIFICATION forming part of Letters Patent No. 488,898, dated December 27, 1892.

Application filed June 19, 1891. Serial No. 396,824. (No model.)

*To all whom it may concern:*

Be it known that I, ROBERT F. NENNINGER, a citizen of the United States, and a resident of Newark, in the county of Essex and State of New Jersey, have invented certain new and useful Improvements in Processes for Treating Materials Containing Metals, of which the following is a specification.

My invention refers to a new and improved process for treating materials containing metals, such as ores containing sulphur, or materials such as jewelers' sweepings to which sulphur in any desirable form (sulphide, sulphite or sulphate) has been added, and it consists essentially in passing such materials together with the fuel through a smelting stack with closed top and two tiers of blast tuyeres, by which arrangement a melting and reducing zone is formed between the upper and lower tier of tuyeres, and a reducing zone at and below the lower set of tuyeres, thus exposing the materials in their descent first to the action of a melting and reducing zone, then to the action of a melting and oxidizing zone, then allowing the gaseous products of combustion and any metallic fumes which may be suspended therein, to separate from the molten mass and to pass off over the surface of the molten mass, which collects in a hearth and arranges itself according to specific gravity, separately drawing off the slag, and such matte, speiss and metal as may have collected and subjecting them to subsequent treatment in the usual manner, or, as in the case of matte, by repeating the above described process. Such metallic fumes as may have passed off with the gaseous products of combustion are collected in a condenser.

In carrying out my process I use by preference apparatus such as shown in the annexed drawing, and consisting of a smelting furnace such as shown and described in United States Letters Patent No. 432,280, granted to me July 15, 1890, combined with a condenser such as shown and described in United States Letters Patent No. 426,465, granted to me April 29, 1890.

In the annexed drawing A represents the smelting furnace, C the condenser, B a flue leading from the hearth of the furnace to the condenser C, and D an apparatus for collecting the fumes which may escape from the condenser. The furnace A consists of a stack opening over its entire cross-sectional area into a reverberatory hearth E. The stack is provided with two tiers of blast tuyeres $a, a$, and $b b$. The hearth E has a cinder tap $c$, and tap-holes $f$ and $g$ for metal and for matte respectively. Any desirable number of taps for slag, speiss, matte and metal may be provided. Blast may be directed into the matte through one or more tuyeres $h$. As shown in the drawing a series of muffles $i$ is placed within the flue B connecting the reverberatory hearth E with the condenser C, which muffles may be used for calcining materials collected from the condenser, or for other purposes. The condenser C consists essentially of an outer stack $j$ and an inner perforated stack $k$, the flue B opening into the annular space $l$ between the two stacks $j$ and $k$. A series of sprinklers $m$ arranged at the top of the annular space $l$ and of the chamber $n$ delivers a shower of water into the annular space and into the chamber $n$ which, as indicated in the drawing, is filled with coke. The bottom of the annular chamber $l$ forms a gutter communicating with a cistern $r$, which may be provided with filters. The upper end of the chamber $n$ communicates with a suction blower $o$, which discharges the gases into the pipe $p$, from which bags $q$ are suspended for collecting solid matter carried off by the gases in the well known manner.

I shall now proceed to describe my process as applied to materials containing volatile and non-volatile metals, sulphur and precious metals. The material or ore with proper fluxes is charged into the furnace A in alternate layers with fuel (preferably coke), or it may be blown into the fuel charge through the upper tier of tuyeres. In descending the charges first pass through a melting and reducing zone, more or less carbon monoxide being formed between the upper and lower set of tuyeres; in their further descent through the stack they then pass through a melting and oxidizing zone near and below the lower set of tuyeres, the remaining carbon and the carbon monoxide being burned to form carbon dioxide, while more or less of the sulphur and metallic fumes are likewise burned. Beneath this oxidizing zone the gaseous products of combustion are allowed to separate from the molten mass (slag, speiss, matte and metal), which arranges itself in layers according to specific gravity in the hearth E while the gases and fumes pass over the molten mass, keep it hot, and are directed to the condenser C through flue B. When the charge contains precious metals but no copper I prefer to have a lead bath in the hearth and to blow air into the iron matte through the tuyere $h$ so as to oxidize the iron and to take up the precious metals by the lead bath, the iron oxide being taken up by the slag; part of the precious metals will pass off with the fumes and is collected in the condenser. Ores containing copper but not in sufficient quantity for bessemerizing are reduced to metallic copper partly in the oxidizing zone near the lower tier of tuyeres, partly through the action of air blown into the matte through the tuyere $h$. The metallic copper takes up the greater part of the precious metals. Such speiss, matte and metal as may be tapped from the hearth E are subjected to further treatment in the usual manner, or the matte may be treated again by my process. The gases and fumes passing through the condenser C are met by sprays of water in the chambers $l$ and $n$ and are then drawn off by the fan $o$ and discharged into a series of bags $q$ where the remaining solid matter is collected, while the gases pass through the pores. The water sprayed into the chambers $l$ and $n$ absorbs the sulphurous acid in the gases and the greater part of the solid matter, more or less of which is dissolved by the sulphurous acid, particularly zinc, while some zinc sulphite forms an insoluble hydrate, and is collected with the sediment, which may also contain oxide of lead, sulphate of lead &c. The water from the chambers $l$ and $n$ collects in the gutter at the bottom of the chamber $l$ and carries with it the sediment into a cistern $r$ (shown in dotted lines at bottom of condenser). The sediment is separated from the liquid by filtration or by filter presses and the clear liquid pumped back into the condenser until a sufficient concentration of the salts is reached, when it is pumped into tanks for crystallization. The sediment collected from the condenser and from the bags may be further treated in any suitable manner for extracting such precious metals as may be contained therein, and for producing therefrom pure lead, zinc or oxides of the same. Sulphates or sulphites may be calcined in the muffles $i$.

It is evident that according to the nature of the materials to be treated and of the products to be obtained one or more of the various steps above described for carrying out my invention may be omitted, such as blowing into the matte, collecting the fumes, or collecting precious metals in a lead bath. By my process I am enabled to smelt ores containing sulphur without previous roasting.

It will be noticed that in my process the gases, fuel and material to be smelted travel in the same direction in the stack, and are subjected within the stack to the action of air blast at two different levels, and the gases are separated at the bottom from the molten mass, as distinguished from other well known processes where the gases and solid matter travel in opposite direction, and where the gases are separated at the top from the fresh charge.

What I claim as my invention, is:

The process of treating materials containing volatile and non-volatile metals and sulphur, which consists in exposing such materials while descending in a stack together with fuel to the action of air blast at two different levels, causing the gaseous products of combustion to travel downward with the descending materials and separating them from the charge and molten mass below both air blasts and after exposure to the second and lower air blast, substantially as described.

In testimony that I claim the foregoing as my invention I have signed my name, in presence of two witnesses, this 17th day of June, 1891.

ROBERT F. NENNINGER.

Witnesses:
A. FABER DU FAUR,
F. FOHR.